United States Patent
Naderer

(10) Patent No.: US 11,929,193 B2
(45) Date of Patent: Mar. 12, 2024

(54) NTC COMPOUND, THERMISTOR AND METHOD FOR PRODUCING THE THERMISTOR

(71) Applicant: TDK Electronics AG, Munich (DE)

(72) Inventor: Michael Naderer, Deutschlandsberg (AT)

(73) Assignee: TDK Electronics AG, Munich (DE)

( * ) Notice: Subject to any disclaimer, the term of this patent is extended or adjusted under 35 U.S.C. 154(b) by 596 days.

(21) Appl. No.: 17/054,806

(22) PCT Filed: Jun. 25, 2019

(86) PCT No.: PCT/EP2019/066847
§ 371 (c)(1),
(2) Date: Nov. 12, 2020

(87) PCT Pub. No.: WO2020/002336
PCT Pub. Date: Jan. 2, 2020

(65) Prior Publication Data
US 2021/0257135 A1 Aug. 19, 2021

(30) Foreign Application Priority Data

Jun. 27, 2018 (DE) .......................... 102018115513.1

(51) Int. Cl.
*H01C 7/04* (2006.01)
*C04B 35/01* (2006.01)
(Continued)

(52) U.S. Cl.
CPC ........... *H01C 7/043* (2013.01); *C04B 35/016* (2013.01); *C04B 35/64* (2013.01); *C04B 37/021* (2013.01);
(Continued)

(58) Field of Classification Search
None
See application file for complete search history.

(56) References Cited

U.S. PATENT DOCUMENTS

| | | | |
|---|---|---|---|
| 5,245,309 | A | 9/1993 | Kawase et al. |
| 7,135,955 | B2 | 11/2006 | Feichtinger et al. |

(Continued)

FOREIGN PATENT DOCUMENTS

| | | |
|---|---|---|
| CN | 1975940 A | 6/2007 |
| DE | 4207915 C2 | 12/1998 |

(Continued)

OTHER PUBLICATIONS

C. Zhao, et al., "Effects of Cu and Zn co-doping on the electrical properties of Ni0.5, Mn2.5, O4 NTC ceramics," ScienceDirect, Journal of the European Ceramic Society 28, (2008) 35-40, Aug. 21, 2007, 6 pages.

(Continued)

*Primary Examiner* — John J Figueroa
(74) *Attorney, Agent, or Firm* — Slater Matsil, LLP

(57) ABSTRACT

An NTC compound, a thermistor and a method for producing a thermistor are disclosed. In an embodiment an NTC compound includes a ceramic material of a Mn—Ni—O system as a main constituent, wherein the Mn—Ni—O system has a general composition $Ni_xMn_2O_{4-\delta}$, wherein y corresponds to a molar fraction of Ni of a total metal content of the ceramic material of the Mn—Ni—O system, which is defined as c(Ni):(c(Ni)+c(Mn)), and wherein the following applies: $0.500 < x < 0.610$ and $0.197 < y < 0.240$.

13 Claims, 2 Drawing Sheets

(51) Int. Cl.
- *C04B 35/64* (2006.01)
- *C04B 37/02* (2006.01)
- *C04B 41/00* (2006.01)
- *C04B 41/48* (2006.01)
- *C04B 41/50* (2006.01)
- *C04B 41/83* (2006.01)
- *C04B 41/86* (2006.01)
- *H01C 17/065* (2006.01)
- *H01C 17/28* (2006.01)

(52) U.S. Cl.
CPC ............ *C04B 41/009* (2013.01); *C04B 41/48* (2013.01); *C04B 41/5022* (2013.01); *C04B 41/83* (2013.01); *C04B 41/86* (2013.01); *H01C 17/06533* (2013.01); *H01C 17/281* (2013.01); *C04B 2235/3217* (2013.01); *C04B 2235/3244* (2013.01); *C04B 2235/3268* (2013.01); *C04B 2235/3281* (2013.01); *C04B 2237/34* (2013.01); *C04B 2237/408* (2013.01)

(56) References Cited

U.S. PATENT DOCUMENTS

| | | | |
|---|---|---|---|
| 2008/0048821 A1* | 2/2008 | Miura | H01C 7/18 338/22 SD |
| 2018/0164162 A1* | 6/2018 | Hioki | G01K 7/223 |
| 2020/0131091 A1* | 4/2020 | Mead | H01C 7/043 |

FOREIGN PATENT DOCUMENTS

| | | |
|---|---|---|
| DE | 10159451 A1 | 6/2003 |
| DE | 112016003480 T5 | 4/2018 |
| EP | 1848010 A1 | 10/2007 |
| JP | S63126204 A | 5/1988 |
| JP | H0869902 A | 3/1996 |
| JP | 2004104093 A | 4/2004 |
| JP | 2005150289 A | 6/2005 |
| JP | 2011171596 A | 9/2011 |

OTHER PUBLICATIONS

H. Schulze, et al., "Synthesis, Phase Characterization, and Properties of Chemical Solution-Deposited Nickel Manganite Thermistor Thin Films," J. Am. Ceram. Soc., 92 [3], The American Ceramic Society, Dec. 8, 2008, 8 pages.

Yu. V. Golikov et al., "Phase Diagrams of the Co—Mn—O System in Air," J. Phys. Chem. Solids, vol. 46, No. 5, Sep. 9, 1984, 5 pages.

* cited by examiner

Galvanically reinforced outer metallization | Novel ceramic system with Al₂O₃ and ZrO₂ doping | Inner electrode of AgPd alloy

NTC COMPOUND, THERMISTOR AND METHOD FOR PRODUCING THE THERMISTOR

This patent application is a national phase filing under section 371 of PCT/EP2019/066847, filed Jun. 25, 2019, which claims the priority of German patent application 102018115513.1, filed Jun. 27, 2018, each of which is incorporated herein by reference in its entirety.

TECHNICAL FIELD

The invention relates to an NTC compound and to a thermistor which comprises a ceramic main body that contains the NTC compound. It also relates to a method for producing the thermistor.

BACKGROUND

For measuring temperatures with the purpose of monitoring and control in a wide variety of applications, mainly thermistors based on sintered NTC compounds, silicon temperature sensors (KTY), platinum temperature sensors (PRTD) or thermocouples (TC) are used. Because of their low-cost production and their pronounced negative resistance temperature characteristics, thermistors of NTC compounds based on ceramic materials, which for example have a spinel structure, are most widely used. Along with the constantly increasing requirements with respect to the performance, capability, and miniaturization of thermistors, the requirements for the aging stability of such components have also increased. One factor that may adversely influence the aging stability of a thermistor is the formation of undesired secondary phases during the production of a ceramic main body for the thermistor. Such secondary phases may lead to mechanical problems, in particular to the formation of cracks in the ceramic main body of the thermistor. Furthermore, the formation of the secondary phases causes the composition of the NTC compound contained in the ceramic main body of the thermistor to change, as a result of which the conductivity and the temperature response of the ceramic main body change. There is, in this case, also a deterioration in the aging properties, because the resistance at 25° C. of the thermistor changes over time. This results in a falsification of the measured temperature.

Typical materials for NTC compounds are based on ceramic materials of the Ni—Mn—O system with a spinel structure, which, because of the requirements demanded of the components, have a molar Ni fraction of the total metal content that promotes the formation of secondary phases during the production of the ceramic main body for the thermistor. Thus, customary NTC compounds have an Ni fraction of the total metal content, which is defined as c(Ni):(c(Ni)+c(Mn)), of ≥0.240. Since, with this Ni fraction, both ceramic materials with the desired spinel structure and secondary phases such as NiO stably coexist, these NTC compounds have a tendency for NiO to form as an undesired secondary phase, which has an adverse effect on the aging stability of the thermistor.

SUMMARY

Embodiments provide an NTC compound which comprises as the main constituent a ceramic material of the Ni—Mn—O system and does not have a tendency for undesired secondary phases to form. Further embodiments provide a thermistor which comprises a corresponding ceramic main body and a method for producing the thermistor.

Here and hereafter, an NTC compound should be understood as meaning a ceramic compound which has a negative temperature coefficient (NTC) and the electrical conductivity of which improves with increasing temperature.

Embodiments provide an NTC compound which comprises as a main constituent a ceramic material of the Mn—Ni—O system and has a general composition $Ni_xMn_2O_{4-\delta}$, where x corresponds to the quantitative proportion of nickel in the ceramic material of the Mn—Ni—O system and y corresponds to the molar Ni fraction of the total metal content of the ceramic material of the Mn—Ni—O system, defined as c(Ni):(c(Ni)+c(Mn)), and where:
0.500<x<0.610 and
0.197<y<0.240.

In a more advantageous embodiment, the NTC compound may contain as the main constituent a ceramic material of the Mn—Ni—O system which has the general composition $Ni_xMn_2O_{4-\delta}$ and where, for x and y applies:
0.520≤x≤0.544 and
0.206≤y≤0.214.

This Ni fraction lies in the optimum stability range of the ceramic material that represents the main constituent of the NTC compound according to embodiments, as a result of which there is hardly any formation of undesirable secondary phases, even at high sintering temperatures during the production process of a ceramic main body for a thermistor. Also, after the sintering at temperatures of up to 1340° C., the NTC compound can be cooled down without any appreciable formation of secondary phases.

Furthermore, the ceramic material that is the main constituent of the NTC compound may have a spinel structure of the general formula $AB_2O_4$, where the A positions may be occupied at least by Ni and the B positions may be occupied at least by Mn.

It is noted that the ceramic material that is the main constituent of the NTC compound may have a non-stoichiometric composition.

It is also noted that the NTC compound may have an oxygen fraction of less than four moles per mole of the NTC compound, which is intended to be illustrated by the expression 4-δ in the general molecular formula $Ni_xMn_2O_{4-\delta}$.

Furthermore, the NTC compound may additively contain at least $ZrO_2$ as a dopant, where a corresponds to the content of $ZrO_2$ and is based on too wt % of $Ni_xMn_2O_{4-\delta}$, where applies:
0.58 wt %≤a≤0.72 wt %.

The addition of $ZrO_2$ allows further stabilization of the NTC compound to be achieved. The aging stability of a thermistor which comprises a ceramic main body that contains the NTC compound can in this way be further improved.

In addition, the NTC compound may contain at least one B-value modifier which is selected from a group of compounds comprising $Al_2O_3$ and CuO. In this case, b corresponds to the content of $Al_2O_3$ and c corresponds to the content of CuO and, based on too wt % of $Ni_xMn_2O_{4-\delta}$, and the following applies:
0 wt %≤b≤13.9 wt %
0 wt %≤c≤8.6 wt %.

The B value is a constant of a thermistor which is determined by the NTC compound used and which indicates the steepness of a resistance-temperature curve of a thermistor in a resistance-temperature diagram, where the steepness increases with increasing B value. The steeper the resistance-temperature curve is, the more the resistance of a thermistor in a specific temperature range changes. The B value can be set by B-value modifiers, which are provided as metal oxides, for example. Conventionally, the B-value modifier is added in excess and the amount of the B-value modifier added may be up to 20 wt %, based on too wt % of a base ceramic material.

The addition of the B-value modifier allows the B value of a thermistor which comprises a ceramic main body that contains the NTC compound according to embodiments to be set within a broad range, which comprises B values from 3136 K to 4528 K, inclusive. This allows the resistance-temperature behavior of a thermistor to be adapted to desired requirements.

What is more, the addition of the B-value modifier allows the specific resistance of a thermistor which comprises a ceramic main body that contains the NTC compound according to embodiments to be set in a range comprising 48 $\Omega$cm to 51540 $\Omega$cm. It must be mentioned that the B value and the specific resistance cannot be set independently of one another. Thus, high B values are accompanied by high specific resistances and low B values are accompanied by low specific resistances.

The production of the NTC compound according to embodiments can be performed by conventional methods. Such a method may comprise for example the substeps:
weighing out starting materials
first wet grinding
first drying
first sieving
calcination
second wet grinding
second drying
second sieving Further embodiments provide a method for producing a thermistor. For this purpose, a ceramic main body which contains the NTC compound according to embodiments is produced. This involves forming the ceramic main body and sintering it at temperatures of up to 1340° C. Electrode layers are applied to the sintered ceramic main body to make electrical contacting with it.

Yet further embodiments provide a method for producing a monolithic thermistor. The thermistor comprises a ceramic main body which contains the NTC compound according to embodiments. For forming the ceramic main body, the NTC compound according to embodiments is processed into granules and then pressed into the desired shape to form the ceramic main body. In a next step, the ceramic main body is sintered at up to 1340° C. After that, electrodes are applied to the outer sides of the ceramic main body to make electrical contact with it.

Embodiments also provide a method for producing a thermistor of a multilayer type of construction, which comprises a ceramic main body that contains the NTC compound according to embodiments. For this purpose, in a first step, the NTC compound according to embodiments is processed into a green sheet, referred to hereafter as a ceramic sheet. This involves suspending the NTC compound according to embodiments in a solvent and providing it with tape casting additives. Then, the ceramic sheet is drawn as a tape by a suitable method and then printed with metal inner electrodes. After that, a desired number of such printed ceramic sheets are stacked and pressed in the stack. Components of the desired base area and number are punched out from the pressed stacks of sheets, then debinded and sintered at a maximum of 1340° C. Contacts are then applied to the outer sides of the ceramic main body.

The contacts on the outer sides of the ceramic main body produced according to one of the preceding embodiments may be galvanically reinforced for further stabilization.

The thermistor produced according to one of the preceding embodiments may be coated with a protective layer which contains glass or a polymer. The protective layer protects the thermistor, and in particular the ceramic main body of the thermistor, from corrosion, in particular in aggressive media such as acids, whereby the aging stability of the thermistor is further improved.

BRIEF DESCRIPTION OF THE DRAWINGS

The invention is described in more detail below on the basis of exemplary embodiments and associated figures.

DETAILED DESCRIPTION OF ILLUSTRATIVE EMBODIMENTS

Elements that are the same, similar or appear to be the same are provided with the same designations in the figures. The figures and the relative sizes of elements in the figures were not drawn to scale.

Figure 1:
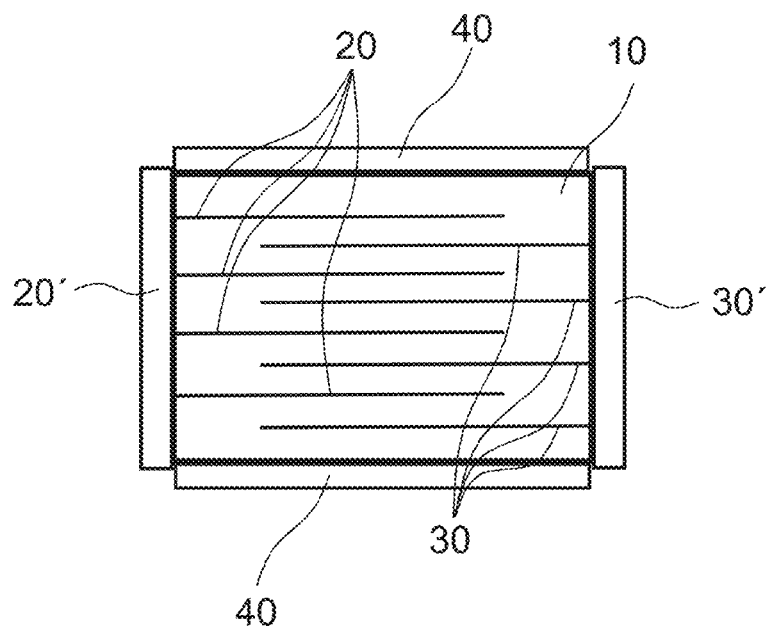
FIG. 1 shows a schematic cross section of an exemplary embodiment of a thermistor of a multilayer type of construction.

FIG. 1 shows a schematic cross section of an exemplary embodiment of a thermistor in a multilayer type of construction, which comprises a ceramic main body 10 that contains an NTC compound according to embodiments.

Chosen for the production of the ceramic main body 10 was an NTC compound which contains as the main constituent a ceramic material with the composition $Ni_{0.529}Mn_2O_{4-\delta}$. The NTC compound additively contains 0.600 wt % of $ZrO_2$ as a dopant and 13.14 wt % of $Al_2O_3$ as a B-value modifier.

For the production of the ceramic main body 10 of the thermistor, in a first step the NTC compound was processed into a ceramic sheet. Then, the ceramic sheet was printed with an inner electrode metallization of an AgPd alloy to produce first and second inner electrodes 20 and 30 of the thermistor.

In a further step, a plurality of the ceramic sheets were stacked one on top of the other in such a way as to obtain an alternating sequence of ceramic sheets with first inner electrodes 20 and ceramic sheets with second inner electrodes 30. The stack of sheets produced was pressed and a component was punched out from the pressed stack of sheets and sintered at temperatures of up to 1340° C.

For connecting the first and second inner electrodes 20 and 30 to outer contacts 20' and 30', a metallization of an AgPd alloy was applied to the end faces and baked in, and for further stabilization was galvanically reinforced, allowing for making electrical contact with the component. The first inner electrodes 20 are thus connected to the outer contacts 20' and the second inner electrodes 30 are connected to the outer contacts 30'.

For further protection, the thermistor produced was coated with a protective layer 40 of glass. After keeping for 2000 h at 150° C. in air without any electrical load, the thermistor thus obtained has a deviation of its resistance at 25° C. of only 0.59±0.093%. On account of this small deviation, the thermistor thus produced meets the requirements for improving the aging stability of thermistors.

Figure 2:
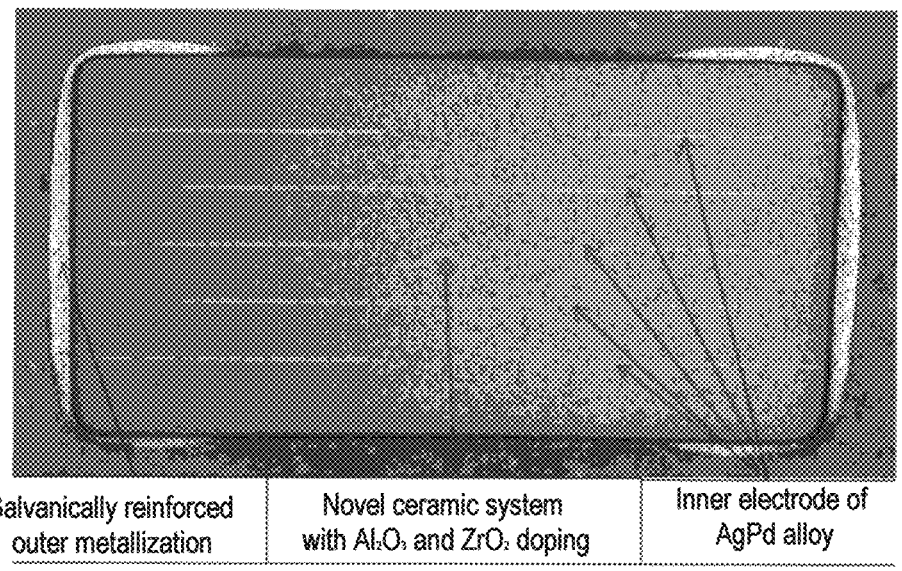
FIG. 2 shows an image of a cut of the thermistor described in FIG. 1.

FIG. 2 shows a cut of the thermistor of a multilayer type of construction that is described in FIG. 1. The individual constituents of the thermistor, such as the NTC compound produced according to the embodiments relating to FIG. 1, the inner electrodes and the galvanically reinforced outer contacts, can be clearly identified.

Figure 3:
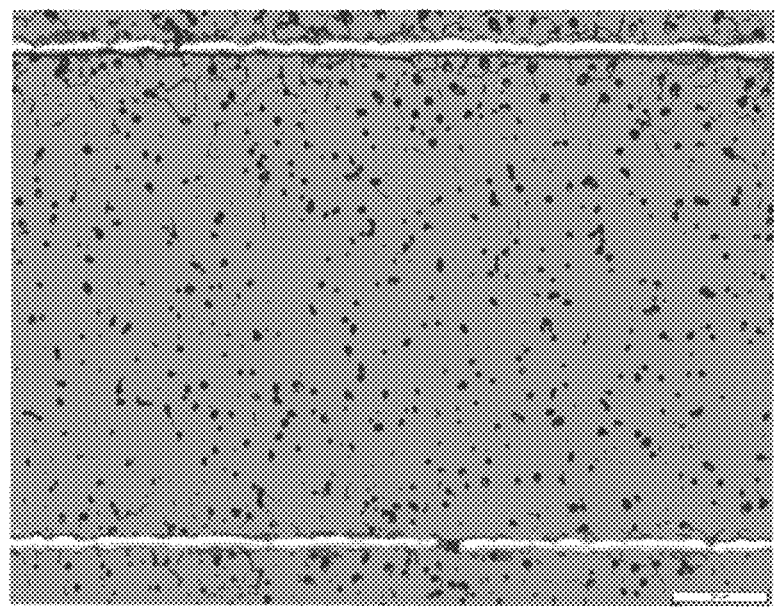
FIG. 3 shows an enlargement of the cut shown in FIG. 2.

FIG. 3 shows an enlarged detail of the cut of FIG. 2. The detail shows inner electrodes (gray lines) with the sintered NTC compound in between. The microstructure of the sintered NTC compound does not have any secondary phases, as a result of which the aging stability of the thermistor is significantly improved. What is more, the sintered NTC compound has a high sintered density and an outstanding connection to the inner electrodes. This shows that the NTC compound is highly suitable for production, allowing high-performance thermistors with aging stability to be created.

The invention is not restricted to the exemplary embodiments by the description of the invention made with reference to exemplary embodiments. The invention rather comprises any novel feature and any combination of features, including in particular any combination of features in the claims, even if this feature or this combination is not itself explicitly indicated in the claims or exemplary embodiments.

The invention claimed is:

1. An NTC compound comprising:
   a ceramic material of a Mn—Ni—O system as a main constituent,
   wherein the Mn—Ni—O system has a general composition $Ni_xMn_2O_{4-\delta}$,
   wherein y corresponds to a molar fraction of Ni of a total metal content of the ceramic material of the Mn—Ni—O system, which is defined as c(Ni):(c(Ni)+c(Mn)), and
   wherein the following applies:
   $0.500 < x < 0.610$ and $0.197 < y < 0.240$; and
   at least $ZrO_2$ as a dopant,
   wherein a corresponds to a content of $ZrO_2$ and is based on 100% by weight of $Ni_xMn_2O_{4-\delta}$, and
   wherein the following applies:
   0.58 wt % ≤ a ≤ 0.72 wt %.

2. The NTC compound according to claim 1, where the following applies:
   $0.520 \le x \le 0.544$ and
   $0.206 \le y \le 0.214$.

3. The NTC compound according to claim 1, wherein the ceramic material has a spinel structure with the general formula $AB_2O_4$, and wherein A positions are occupied at least by Ni and B positions are occupied at least by Mn.

4. The NTC compound according to claim 1, further comprising at least one B-value modifier selected from the group consisting of CuO and $Al_2O_3$.

5. The NTC compound according to claim 1, further comprising either only CuO or only $Al_2O_3$ as a B-value modifier, wherein b corresponds to a content of $Al_2O_3$ and c corresponds to a content of CuO and, based on 100 wt % of $Ni_xMn_2O_{4-\delta}$, the following applies:
   0 wt % ≤ b ≤ 13.9 wt % and
   0 wt % ≤ c ≤ 8.6 wt %.

6. A thermistor comprising:
   a ceramic main body containing the NTC compound according to claim 1.

7. The thermistor according to claim 6, wherein a composition of the thermistor is chosen such that, when kept in air at 150° C. without any electrical load, after 2000 h, the thermistor has a maximum aging of 0.59±0.093%, based on a resistance at 25° C.

8. The thermistor according to claim 6, wherein the thermistor has a B value in a range of 3,136 K to 4,528 K.

9. The thermistor according to claim 6, wherein the ceramic main body has a specific resistance $\rho_{25° C.}$, and wherein $\rho_{25° C.}$ is in a range of 48 Ωcm to 5,1540 Ωcm.

10. The thermistor according to claim 6, further comprising a protective layer containing glass or a polymer.

11. A method for producing the thermistor according to claim 6, the method comprising:
    forming the ceramic main body from the NTC compound by producing granules from the NTC compound, pressing the granules and then sintering the pressed granules at a maximum temperature of 1,340° C.;
    applying electrode layers to the sintered ceramic main body; and
    baking the electrode layers into the ceramic main body.

12. A method for producing the thermistor according to claim 6, the method comprising:
    processing the NTC compound into a ceramic sheet;
    printing the ceramic sheet with inner electrodes;
    stacking a plurality of ceramic sheets one on top of the other;
    pressing the stacked ceramic sheets;
    punching out a ceramic component from the pressed and stacked ceramic sheets;
    debinding the ceramic component;
    sintering the ceramic component to obtain the ceramic main body; and
    applying outer contacts to the ceramic main body.

13. The method according to claim 12, wherein a metal is selected from the group consisting of Ag, Pd and an alloy of the two elements, and wherein the metal is used for the inner electrodes.

* * * * *